United States Patent
Nabuurs et al.

(10) Patent No.: US 9,012,027 B2
(45) Date of Patent: Apr. 21, 2015

(54) AQUEOUS EMULSION

(75) Inventors: Tijs Nabuurs, Waalwijk (NL); Gerardus Cornelis Overbeek, Waalwijk (NL); Jeffrey Stubbs, Wilmington, MA (US)

(73) Assignee: DSM IP Assets B.V., Heerlen (NL)

( * ) Notice: Subject to any disclaimer, the term of this patent is extended or adjusted under 35 U.S.C. 154(b) by 46 days.

(21) Appl. No.: 13/516,452

(22) PCT Filed: Dec. 17, 2010

(86) PCT No.: PCT/EP2010/070136
§ 371 (c)(1),
(2), (4) Date: Oct. 31, 2012

(87) PCT Pub. No.: WO2011/073417
PCT Pub. Date: Jun. 23, 2011

(65) Prior Publication Data
US 2013/0065070 A1 Mar. 14, 2013

(30) Foreign Application Priority Data
Dec. 17, 2009 (EP) .................................... 09179695

(51) Int. Cl.
| | | |
|---|---|---|
| *C09D 135/02* | (2006.01) | |
| *C08F 265/04* | (2006.01) | |
| *C08F 267/06* | (2006.01) | |
| *C08L 35/02* | (2006.01) | |
| *C08F 212/08* | (2006.01) | |
| *C08F 220/18* | (2006.01) | |
| *C08F 222/14* | (2006.01) | |

(52) U.S. Cl.
CPC ............ *C09D 135/02* (2013.01); *C08F 265/04* (2013.01); *C08F 267/06* (2013.01); *C08L 35/02* (2013.01); *C08F 212/08* (2013.01); *C08F 220/18* (2013.01); *C08F 222/14* (2013.01); *C08F 2220/1808* (2013.01); *C08F 2220/1825* (2013.01); *C08F 2220/1833* (2013.01)

(58) Field of Classification Search
CPC ... C09D 135/02; C08F 265/04; C08F 267/06; C08F 220/18; C08F 212/08; C08L 35/02
USPC ................. 524/556, 559; 428/522; 427/385.5
See application file for complete search history.

(56) References Cited

U.S. PATENT DOCUMENTS 4,206,292 A * 6/1980 Ohya et al. .................... 525/225

FOREIGN PATENT DOCUMENTS

| GB | 1 001 716 | 8/1965 |
|---|---|---|
| GB | 1001716 A * | 8/1965 |
| GB | 2 017 111 | 10/1979 |
| WO | 95/29944 | 11/1995 |
| WO | 95/29963 | 11/1995 |

OTHER PUBLICATIONS

International Search Report for PCT/EP2010/070136, mailed Feb. 21, 2011.
Written Opinion of the International Searching Authority for PCT/EP2010/070136, mailed Feb. 21, 2011.
Wheeler, Jr., *Poly(vinyl Chloride) Processes and Products*, Environmental Health Perspectives, vol. 41, pp. 123-128 (1981).
Jenkins et al, *Glossary of Basic Terms in Polymer Science (IUPAC Recommendations 1996)*, IUPAC, Pure and Applied Chemistry 68, 2287-2231 (1996).

* cited by examiner

*Primary Examiner* — Michael M Bernshteyn
(74) *Attorney, Agent, or Firm* — Nixon & Vanderhye P.C.

(57) ABSTRACT

The invention relates to an aqueous emulsion comprising at least a vinyl polymer, said vinyl polymer comprising: a) 45 to 99 wt % of itaconate ester monomers having formula (I), wherein R and R' are independently an alkyl or an aryl group; b) 0.1 to 15 wt % of ionic or potentially ionic unsaturated monomers; c) 0 to 54 wt % of unsaturated monomers, different from a) and b); and 0.9 to 54.9 wt % by weight of total monomers of a chaser monomer composition added subsequently and polymerized after the polymerization of monomers a), b) and c); wherein a)+b)+c) and the chaser monomer composition add up to 100%; and wherein the aqueous emulsion contains less than 0.5 wt % free itaconate ester monomers of formula I based on the total weight of the aqueous emulsion.

(I)

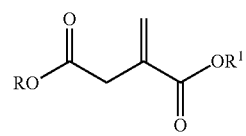

16 Claims, No Drawings

AQUEOUS EMULSION

This application is the U.S. national phase of International Application No. PCT/EP2010/070136, filed 17 Dec. 2010, which designated the U.S. and claims priority to EP Application No. 09179695.3, filed 17 Dec. 2009, the entire contents of each of which are hereby incorporated by reference.

The present invention relates to an aqueous emulsion comprising a vinyl polymer obtainable from itaconate ester monomers, a process for making such aqueous emulsion, a coating obtained from the aqueous emulsion and the coated substrate.

There is a growing interest in utilizing renewable resources for environmentally friendly products and processes. Itaconic acid and its ester derivatives were identified as one of the valuable chemicals that can be derived from biomass, which may be potentially useful also in relation to producing "green" polymers for coating formulations. It is desired thus to manufacture resins comprising a high concentration of biorenewable raw materials, such as itaconate monomers and emulsions having a large proportion of monomers based on biobased resources that can be used in coatings, paints, lacquers, inks, overprint varnish, film coatings, or adhesives.

However, in spite of the advantageous properties of itaconic acid and its esters, problems with their polymerization were identified as a key barrier to commercial developments. This is especially true for free radical polymerisation, which results in a poor conversion of itaconic acid and its esters into polymers, i.e. a large amount of such monomers used in polymerization may remain unreacted within a practical time frame. This is partly caused by the low propagation rate constant of such monomers. The free (unreacted) monomers present in the coating formulations may potentially be released from the coating, which is not desired from a health or an environmental perspective. To obtain a high conversion, one may need to use lengthy heating to obtain an optimal reaction temperature or extremely long processing times that are not desired, nor economical.

The conversion of polymers based upon vinyl monomers containing pendant carboxylic acid groups and especially itaconic acid was studied in US200910286947. A monomer conversion of 50% or more is obtained by partially neutralizing the carboxylic acid functionality at a level of from 25 to 85 mol % for each mole of carboxylic acid functionality present.

U.S. Pat. No. 3,321,431 discloses a process for preparing an aqueous copolymer emulsion comprising dimethyl itaconate in an amount of up to 80 wt % of polymerisable constituents, ethylenically unsaturated amides and other ethylenically unsaturated monomers, wherein the polymerisation is done in an organic solvent that is water soluble in concentrations above 10 wt %.

GB 1001716 relates to emulsion copolymers of alkyl esters of α,β-ethylenically unsaturated monocarboxylic acids and monoalkyl esters of itaconic acid, their salts and the coatings therefrom.

GB 2017111 relates to a vinyl chloride resin composition comprising dialkyl itaconate and alkyl methacrylate.

Since itaconic acid and other acid functional monomer may lead to very hydrophilic and hence water sensitive polymers, it is more advantageous to use itaconate ester monomers instead. Furthermore, to have a low impact on the environment, emulsion polymerisation leading to essentially solvent free waterborne resins is preferred over other polymerisation mechanisms leading to solvent based resins.

The objective of the present invention is to provide an aqueous emulsion comprising a vinyl polymer comprising a high concentration of itaconate ester monomers wherein the emulsion composition presents a low free itaconate monomer content.

We have now surprisingly discovered that, despite the low propagation rate constant, a high itaconate monomer conversion can be obtained by using a particular composition that also comprises vinyl monomers (including itaconate ester monomers) to form a vinyl polymer and a chaser monomer composition that is added subsequently.

Through the invention a high conversion of itaconate ester monomers can now be achieved without the need for lengthy heating to reaction temperature or extremely long processing times.

The amount of the free itaconate ester monomers left after conversion with the chaser monomer composition is readily determined using either liquid (LC) or gas chromatography (GC).

According to the present invention there is provided an aqueous emulsion comprising at least a vinyl polymer, said vinyl polymer comprising:

a) 45 to 99 wt % of itaconate ester monomers having formula I:

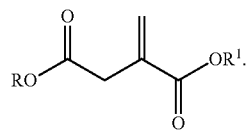

wherein R and R' are independently an alkyl or an aryl group;

b) 0.1 to 15 wt % of ionic or potentially ionic unsaturated monomers;

c) 0 to 54 wt % of unsaturated monomers, different from a) and b); and 0.9 to 54.9 wt % by weight of total monomers of a chaser monomer composition added subsequently and polymerised after the polymerisation of monomers a), b) and c);

wherein a)+b)+c) and the chaser monomer composition add up to 100%; and wherein the aqueous emulsion contains less than 0.5 wt % free itaconate ester monomers of formula I based on the total weight of the aqueous emulsion.

In another embodiment according to the invention there is provided an aqueous emulsion comprising at least a vinyl oligomer polymer, the oligomer-polymer comprising:

a) 45 to 99 wt % of itaconate ester monomers having formula I:

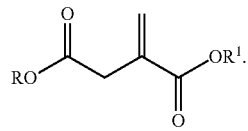

wherein R and R' are independently an alkyl or an aryl group;

b) 0.2 to 21 wt % of ionic or potentially ionic unsaturated monomers;

c) 0 to 54 wt % of unsaturated monomers, different from a) and b);

and 0.8 to 54.8 wt % by weight of total monomers of a chaser monomer composition added subsequently and polymerised after the polymerisation of monomers a), b) and c); wherein a)+b)+c) and the chaser monomer composition add up to 100%; and wherein the aqueous emulsion contains less than 0.5 wt % free itaconate ester monomers based on the total weight of the aqueous emulsion.

Free itaconate ester monomers means herein the remaining of itaconate ester monomers a) left after the formation of the vinyl polymer and the polymer phase comprising the chaser monomer composition.

Preferably the aqueous emulsion contains less than 0.2 wt % free itaconate ester monomers based on the total weight of the aqueous emulsion; more preferably less than 0.1 wt % free itaconate ester monomers; and most preferably less than 0.07 wt % free itaconate ester monomers based on the total weight of the aqueous emulsion.

Preferably the vinyl polymer comprises itaconate ester monomers a) according to formula I where R and R' are alkyl or aryl groups. Even more preferred is that R and R' are identical. Most preferred is that R and R' are both one of methyl, ethyl, butyl or 2-ethylhexyl groups.

Suitable itaconate ester monomers are for example one or more of a dialkyl ester of itaconic acid and diaryl ester of itaconic acid. Examples include, but are not limited to, dimethyl itaconate, diethyl itaconate, dibutyl itaconate, di(2-ethylhexyl) itaconate, dibenzyl itaconate, and diphenyl itaconate. Especially preferred are dimethyl itaconate, diethyl itaconate, dibutyl itaconate, and di(2-ethylhexyl)itaconate.

Preferably the vinyl polymer contains from 50 to 99 wt % of itaconate ester monomers a), more preferably from 50 to 95 wt %, even more preferably from 60 to 95 wt %, especially preferably from 70 to 95 wt %, and most especially preferably from 90 to 95 wt % by weight of the total monomers used.

The ionic or potentially ionic unsaturated monomers b) are preferably acid functional monomers such as itaconic acid, itaconic anhydride, mono-alkyl esters of itaconic acid (preferably monomethyl itaconate, monoethyl itaconate, monobutyl itaconate, mono(2-ethylhexyl)itaconate or mono-R-hydroxyethyl esters), or mono-aryl esters of itaconic acid (such as monobenzyl itaconate), acrylic acid, methacrylic acid, and β-carboxyethyl acrylate. Most preferred acid functional monomers are those comprising an itaconic acid unit (i.e. when R or R' in formula I. is an H atom), since the incorporation of such itaconate monomers may further increase the amount of monomers derived from renewable resources in the vinyl monomer.

However, acid functional monomers comprising an acrylic acid or methacrylic acid unit are also suitable for the purpose of making the vinyl polymer.

Olefinically unsaturated dicarboxylic acids or their anhydrides, such as maleic anhydride and fumaric acid are other examples which can be used for component b). A proportion of the polymer-bound carboxyl groups from such carboxylic acid functional monomers may be subsequently iminated to form amino ester groups, thereby providing chain pendant amine groups.

Preferably, the total amount of monomers derived from potentially renewable sources, such as for example monomers a) and for instance the mono-itaconate esters belonging to component b) is at least 50 wt %, more preferably at least 70 wt % and most preferably at least 90 wt % of the total amount of monomers used.

To obtain an effective incorporation of the acid monomers it is preferred before or during the polymerisation to neutralize less than 25 mole % of the acid functional monomers, more preferably less than 10 mole %, and most preferred none at all. In case the acid monomers are neutralized this can be done with the inorganic and organic bases known to those skilled in the art. Examples include for instance, but are not limited to, ammonia, dimethyl ethanol amine, triethyl amine, dimethyl butyl amine, sodium hydroxide, potassium hydroxide, lithium hydroxide. The most preferred base is ammonia.

Unsaturated monomers c) different from components a) and b) which may be used to form the vinyl polymers include 1,3-butadiene, isoprene, styrene, α-methyl styrene, divinyl benzene, acrylonitrile, methacrylonitrile, vinyl halides such as vinyl chloride, vinyl esters such as vinyl acetate, vinyl propionate, vinyl laurate, and vinyl esters of versatic acid such as VeoVa 9 and VeoVa 10 (VeoVa is a trademark of Shell), heterocyclic vinyl compounds, alkyl esters of mono-olefinically unsaturated dicarboxylic acids (such as di-n-butyl maleate and di-n-butyl fumarate) and, in particular, esters of acrylic acid and methacrylic acid of formula

$CH_2=CR^1COOR^2$ wherein $R^1$ is H or methyl and $R^2$ is optionally substituted alkyl or cycloalkyl of 1 to 20 carbon atoms (more preferably 1 to 8 carbon atoms) examples of which are methyl acrylate, methyl methacrylate, ethyl acrylate, ethyl methacrylate, n-butyl acrylate, n-butyl methacrylate, isobutyl methacrylate, 2-ethylhexyl acrylate, 2-ethylhexyl methacrylate, isopropyl acrylate, isopropyl methacrylate, n-propyl acrylate, n-propyl methacrylate, and hydroxyalkyl (meth)acrylates such as hydroxyethyl acrylate, 2-hydroxyethylmethacrylate, 2-hydroxypropyl methacrylate, 2-hydroxypropyl acrylate, and their modified analogues like Tone M-100. (Tone is a trademark of Union Carbide Corporation). Other examples of useful monomers include (meth)acrylamide and their derivatives, like methylol (meth)acryl amide.

Particularly preferred unsaturated monomers (c) comprise one or more monomers of the formula $CH_2=CR^1COOR^2$ defined above. Such monomers are defined herein as acrylic monomers.

Preferably the unsaturated monomers c) are methacrylic monomers, acrylic monomers, styrene, styrene-acrylics or combinations thereof. More preferably the unsaturated monomers c) are methyl (meth)acrylate, ethyl (meth)acrylate, butyl (meth)acrylate, 2-ethylhexyl (meth)acrylate, styrene and combinations thereof.

The vinyl polymer may also comprise other useful monomers, as described below.

The vinyl polymers according to the invention may contain di- or multifunctional monomers to aid in the development of high molecular weight. Preferably these are polyunsaturated vinyl monomers such as di- or trifunctional vinyl monomers, such as for instance ethylenediol diacrylate, butylenediol diacrylate, hexylenediol diacrylate, allyl (meth)acrylate, trimethylol propane triacrylate, divinyl benzene and combinations thereof. However, this list can be extended with all polyunsaturated monomers, preferably the di- or triacrylate or di- or trimethacrylate monomers.

For many applications improved adhesion to specific substrates is a key performance indicator. Adhesion can be improved in several ways: by reacting the acid groups of the polymer emulsion with aziridines, such as ethylene imine, propylene imine, or butylene imine, or by incorporating wet adhesion promoting monomers, such as ureido functional monomers (for instance PLEX 6852 ex. Evonik, or Sipomer WAMI or II ex. Rhodia). In a special embodiment it is preferred to use from 2 to 12 wt % of the ureido functional monomers, more preferably from 4 to 11 wt % based on the total monomer composition.

Especially for adhesion to metal substrates or improved pigment compatibility the incorporation of phosphate functional monomers, such as Sipomer PAM 1 or 2 (ex. Rhodia) can be envisaged.

The vinyl polymers may often advantageously contain comonomers which provide an adhesion and/or crosslinking functionality to the resulting polymer coating. Examples of these, some of which have already been mentioned above, include acrylic and methacrylic monomers having at least one free hydroxyl, epoxy, acetoacetoxy, ketone or amino group, such as amides, hydroxyalkyl esters and amino alkyl esters of acrylic acid and methacrylic acid, glycidyl acrylate, glycidyl methacrylate, acetoacetoxy ethyl methacrylate, t-butylamino ethyl methacrylate, diacetone acrylamide and dimethylamino ethyl methacrylate; other adhesion promoting monomers include heterocyclic vinyl compounds such as vinyl pyrrolidone and vinyl imidazole.

Such monomers comprising adhesion and/or crosslinking functionality are preferably used in an amount of from 0.1 to 10 wt %, more usually from 0.1 to 5 wt % of the total weight of monomers.

The vinyl polymers carrying crosslinking functionality such as hydroxyl groups may be crosslinked with a crosslinking agent (i.e. crosslinker) such as a polyisocyanate, melamine, or glycoluril. Ketone or aldehyde carbonyl groups may be crosslinked for example with a polyamine or polyhydrazide such as adipic acid dihydrazide, oxalic acid dihydrazide, phthalic acid dihydrazide, terephthalic acid dihydrazide, isophorone diamine and 4,7-dioxadecane-1,10 diamine. It will be noted that such crosslinking agents will effect crosslinking by virtue of forming covalent bonds.

The itaconate ester monomers (component a)) are poorly polymerisable monomers, therefore after the formation of the vinyl polymer there will be still a certain amount of free itaconate ester monomers available in the aqueous emulsion.

A chaser monomer composition is defined herein as one or more monomers added subsequently to the aqueous emulsion and polymerised after the polymerisation of monomers a), b) and c) to facilitate a high conversion of the itaconate ester monomers. As a result an additional polymer phase is formed from the chaser monomer composition with free itaconate ester monomers left after the formation of the vinyl polymer comprising components a), b) and c).

The chaser monomer composition and any free itaconate ester monomers a) left unreacted into the vinyl polymer will together form a separate crop of polymer chains (i.e. a separate polymer phase), having a different composition than the vinyl polymer which is formed during the earlier polymerization stage(s). These polymer chains may reside in the same polymer particles as those that are formed during the polymerisation of the vinyl monomers a), b) and c).

Suitable chaser monomers may comprise (meth)acrylic monomer(s), styrene and/or combinations thereof. Preferred monomers are methyl (meth)acrylate, ethyl (meth)acrylate, butyl (meth)acrylate, styrene and combinations thereof. More preferred monomers are styrene, methyl acrylate, ethyl acrylate or butyl acrylate and combinations thereof. Most preferred are ethyl acrylate, butyl acrylate and styrene and combinations thereof.

The unsaturated monomers of component c) include also the suitable chaser monomers described above. Component c) in the vinyl polymer and the chaser monomer composition may thus be the same or different monomer composition. Preferably component c) in the vinyl polymer is different from the chaser monomer composition. The main difference between the unsaturated monomers used for component c) present in the vinyl polymer and the chaser monomer composition resides mainly in the moment of the polymerisation when they are added. Preferably the chaser monomer composition is added towards the end of the polymerisation process of the vinyl polymer comprising components a), b) and c) and more preferably the chaser monomer composition is added at the end of the polymerisation process of the vinyl polymer comprising a), b) and c).

Preferably the chaser monomer composition amounts from 1 to 20 wt % of the total monomer composition, more preferably from 1 to 15 wt % and most preferably from 2 to 10 wt % based on total monomer composition. By total monomer composition herein is to be understood monomers a), b), c), the chaser monomer composition and any further monomers added in the aqueous emulsion. In a multistage vinyl polymer, such as an oligomer polymer, the total monomer composition also includes all stages (i.e. also the monomers forming the oligomer or any further stage).

Preferably the chaser composition does not include any of the component a) itaconate ester monomers. Preferably the chaser composition also does not include any mono-itaconate ester monomers falling under component b).

The chaser monomer composition is preferably fed over a period of time to the emulsion polymerisation mixture, although adding it in one portion is not excluded.

Preferably the chaser monomer composition is added over a period of from 5 to 120 minutes, more preferably from 10 to 90 minutes, and most preferably from 10 to 70 minutes.

By a vinyl polymer herein is meant a homo or copolymer derived from the addition polymerisation (using a free radical process) of at least one olefinically unsaturated monomer having a polymerisable carbon-carbon double bond. By a vinyl monomer is therefore meant herein an olefinically unsaturated monomer.

By a vinyl polymer is meant herein a polymer obtained by free radical emulsion polymerisation of vinyl monomers in a liquid carrier medium of which water is the principal component. Preferably the liquid carrier medium contains at least 50% water, more preferably at least 90% water by weight of the liquid carrier medium). The dispersed particles of the polymer emulsion are normally of colloidal size. The preferred particle size ranges from 40 to 400 nm, more preferably from 60 to 220 nm and most preferably from 70 to 160 nm.

Preferably, the emulsions contain low amounts of organic solvents, more preferred no solvent at all. The emulsions according to the invention preferably contain less than 5 wt % of organic solvent, more preferred less than 2 wt %, most preferred no organic solvent at all.

All the vinyl polymers used in the invention composition are normally made using free radical addition polymerisation in an aqueous emulsion polymerisation process to form an aqueous polymer emulsion (alternatively termed an aqueous polymer latex).

Such an aqueous emulsion polymerisation process is, in itself, well known in the art and need not be described in great detail. Suffice to say that such a process involves dispersing the monomers in an aqueous medium and conducting polymerisation using a free-radical yielding initiator and (usually) appropriate heating (e.g. 30 to 120° C.) and agitation (stirring) being employed. The aqueous emulsion polymerisation can be effected using one or more conventional emulsifying agents, these being surfactants. Anionic and non-ionic surfactants can be used, and also combinations of the two types; cationic surfactants can also be used. Chain transfer agents (e.g. mercaptans or suitable cobalt chelate complexes) may be included if desired to control molecular weight.

According to another embodiment of the invention there is further provided a process for making an aqueous emulsion comprising at least a vinyl polymer, said process comprising at least steps:
I. emulsion polymerisation of:
   a) 45 to 99 wt % of itaconate ester monomers having formula I:

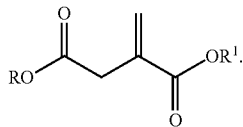

wherein R and R' independently are an alkyl or an aryl group;
   b) 0.1 to 15 wt % of ionic or potentially ionic unsaturated monomers;
   c) 0 to 54 wt % of unsaturated monomers, different from a) and b);
II. emulsion polymerisation of 0.9 to 54.9% of monomers of a chaser monomer composition, in the presence of the vinyl polymer obtained in step I;
wherein the monomers in I and II add up to 100% and wherein the aqueous emulsion contains less than 0.5 wt % free itaconate ester monomers of formula I based on the total weight of the aqueous emulsion, more preferably less than 0.2 wt %, and most preferably less than 0.07 wt % based on the total weight of the aqueous emulsion.

In the above process it is possible to also have other steps, such as making an oligomer polymer or another multistage vinyl polymer before adding the chaser monomer composition.

Furthermore, step II does not restrict the chaser monomer composition only being added at the end of step I, but also to include that the chaser monomer composition is added towards the end of the polymerization process of step I. Therefore, by the resulting emulsion for which the content of free itaconate monomers is determined herein is meant the emulsion obtained after all possible intermediate steps and after reacting the chaser monomer composition to facilitate conversion of the free itaconate ester monomer.

By a multistage vinyl polymer herein is meant a vinyl polymer system that has been formed by a multistage emulsion polymerisation process in which two or more polymers are prepared by the sequential aqueous emulsion polymerisation of two or more distinct vinyl monomer mixtures. Thus in its simplest (and preferred) form a first polymer latex is first formed (by emulsion polymerisation), and then a second polymer is formed by emulsion polymerisation in the presence of the first polymer (the first, second and any further polymer stage being in fact parts of the vinyl polymer comprising components a), b) and c)).

The second polymer could be soft if the first polymer is hard, or could be hard if the first polymer is soft. Preferably the first polymer of a two stage vinyl polymer has a glass transition temperature in the range of from −50 to +20° C. Preferably the second polymer of a two stage vinyl polymer has a glass transition temperature the range of from +30 to 130° C. and even more preferably from +40 to 125° C. At any rate, preferably both phases have Tg values differing by at least 10° C., more preferred 30° C., most preferred 50° C., and even more preferred 60° C. If the hard phase is the first polymer in the vinyl polymer, then the soft phase may also be partly blended in the second polymer.

More complex multistage polymer designs include ones with two or more soft polymers and for two or more hard polymers, the polymerisations being carried out in any order. Multistage polymers may comprise monomers arranged in any suitable structures, such as random, branched and block copolymers.

The emulsion polymerisation of the vinyl monomers to form the vinyl polymer can be run in different ways. One can envisage straight emulsions, with only one monomer feed (possibly other than the seed polymer), sequential polymers, powerfeed or gradient polymers, and oligomer-polymer emulsions where preferably one of the polymer phases contains significantly more acid functionality than the other phase(s).

An emulsion polymerisation for making the vinyl polymer may be carried out using an "all-in-one" batch process (i.e. a process in which all the materials to be employed are present in the polymerisation medium at the start of polymerisation) or a semi-batch process in which one or more of the materials employed (usually at least one of the monomers) is wholly or partially fed to the polymerisation medium during the polymerisation. In-line mixing for two or more of the materials employed may also be used.

The vinyl monomers for making the vinyl polymer are preferably polymerised via a seeded radical polymerisation, although this is not intended to limit the invention. The seed can be formed in-situ, meaning that part of the monomer feed is first allowed to polymerise, before the bulk of the monomer feed is added, or can be prepared separately. In this latter case an emulsion, either prepared via emulsion polymerisation or solution-dispersion polymerisation, is used as seed. This seed, obviously, may be made from renewable monomers.

In the formation of a seeded vinyl polymer, the emulsion polymerisation to form the first formed polymer phase is conducted in the presence of a seed polymer(s), the latter stage preferably also being made using an emulsion polymerisation process. It is also possible to add further seed polymer when commencing the second or subsequent polymerisation(s) of the multistage polymerisation process.

The seed polymer may be pre-formed, i.e. formed separately and added to the vessel to be used for the sequential polymerisation process, or may be formed in-situ prior to the preparation of the multistage polymer, i.e. made in the same vessel to be used for the sequential polymerisation process.

The seed polymer may have a composition similar to that of any of the vinyl polymer phases, but it can also be different. The amounts and types of monomers possible to make the seed polymer(s) will of course depend on the particular multistage polymer in the composition. Typically the (co)monomers employed will be selected from methyl methacrylate, n-butyl methacrylate, isobutyl methacrylate, t-butyl methacrylate, 2-ethylhexyl acrylate, ethyl methacrylate, styrene, n-butyl acrylate, 2-ethylhexyl methacrylate acrylic acid and methacrylic acid.

The seed polymer can also consist of itaconate ester copolymers or their combinations with any of the monomers listed above for the seed polymer. It is, however, also imaginable that the seed consists of a polyurethane dispersion, urethane-acrylic emulsion, alkyd emulsions, polyester emulsion, polyepoxy resin dispersions and mixtures thereof.

It is preferred that this seed is hydrophobic by nature. In other words, in the case of an in-situ seed, it is preferred that ≥80 wt %, more preferably ≥90 wt %, and most preferably ≥93 wt % of the monomers comprised in the seed polymer should preferably have a water solubility of less than 2 g/100 mL of water at 18° C., more preferably less than 1 g/100 mL, and most preferably less than 0.5 g/100 mL of water. In the case of a premanufactured seed the above water solubility should describe the polymer making up the seed, and not the individual monomers making up the seed polymer.

The seed polymer may comprise from 0.5 to 25 wt % of the total polymer mass, more preferably from 1.0 to 15 wt %, most preferably from 2.5 to 10 wt % of the total polymer mass, including the polymer phase comprising the chaser monomer composition.

The weight average molecular weight Mw of the (or each) seed polymer will often be within the range of from 10,000 to 6×10⁶ Daltons, more preferably from 20,000 to 1×10⁶, and most preferably from 50,000 to 800,000 Daltons. Polymer molecular weights may be determined by gel permeation chromatography (GPC) calibrated using THF as solvent and an appropriate known polymer as standard, such as polystyrene standards ranging from 500 to 4,000,000 gram/mol.

The aqueous emulsion according to the invention also relates to the seeded polymerisation of itaconates both in normal waterborne emulsions, in oligomer-polymer emulsions using an oligomer (preferably the oligomers having a high acid value), and both of these in combination with alkyds, polyesters, polyurethanes and epoxy resins.

The Tg of a polymer herein stands for the glass transition temperature and is well known to be the temperature at which a polymer changes from a glassy, brittle state to a rubbery state. Tg values of polymers may be determined experimentally using techniques such as differential scanning calorimetry (DSC) or calculated using the Fox equation. The Tg values and ranges given herein are based on calculated Tg values using the Fox equation.

The Tg, in degrees Kelvin, of a copolymer having "n" copolymerised comonomers is given by the weight fractions W of each comonomer type and the Tg's of the homopolymers (in Kelvin) derived from each comonomer according to the Fox equation:

$$\frac{1}{Tg} = \frac{W_1}{Tg_1} + \frac{W_2}{Tg_2} + \ldots + \frac{W_n}{Tg_n}$$

The calculated Tg in Kelvin may be readily converted to ° C.

Preferably the calculated Tg of a single phase vinyl polymer is in a range from −30 to +125° C.

Vinyl polymers obtained by sequential polymerisation may comprise oligomer supported emulsions. In these emulsions it is preferred in the context of this invention that there is a difference between the polymer phases in acid value, independently or in combination with a difference in Tg. For such emulsions, preferably the first polymer phase will have an acid value of from 0 to 130 mg KOH/g of solid polymer, more preferably from 5 to 100 mg KOH/g of solid resin, and most preferably from 15 to 75 mg KOH/g of solid resin. For such emulsions, the preferences in difference in Tg are similar to those mentioned below for powerfeed polymerisation.

It may be mentioned that polymer(s) of lower molecular weight, i.e. oligomer(s), usually having Mw of not more than 80,000 Daltons (eg Mw in the range of from 5,000 to 80,000 Daltons) may be used in conjunction with higher molecular weight polymers (eg Mw at least 100,000 to 6×10⁶ Daltons) in the provision of the multistage polymer(s). For example the oligomer may be a hard polymer and the higher molecular weight polymer may be a soft polymer, or vice versa.

In another embodiment according to the invention there is provided a process for making an aqueous emulsion comprising at least a vinyl oligomer polymer, said process comprising at least steps:

I. emulsion polymerisation of components comprising:
a) 45 to 99 wt % of itaconate ester monomers having formula I:

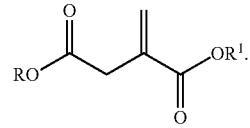

wherein R and R' independently are an alkyl or an aryl group,
b) 0.1 to 15 wt % of ionic or potentially ionic unsaturated monomers,
c) 0 to 54 wt % of unsaturated monomers, different from a) and b), to make an oligomer;

II. emulsion polymerisation of unsaturated monomers comprising components a), b) and c) to make a polymer; wherein the Tg difference between the oligomer of step I and the polymer of step II is at least 10° C.;

III. emulsion polymerisation of 0.9 to 54.9% of monomers of a chaser monomer composition, in the presence of the resulting vinyl oligomer polymer; wherein the monomers in I, II and II add up to 100% and wherein the aqueous emulsion contains less than 0.5 wt % free itaconate ester monomers of formula I based on the total weight of the aqueous emulsion, more preferably less than 0.2 wt %, and most preferably less than 0.07 wt % based on the total weight of the aqueous emulsion.

In a special embodiment according to the invention, oligomer stabilized polymer emulsions are described wherein the acid functional oligomer serves as a colloidal stabilizer for a hydrophobic, essentially acid free second stage polymer composition. In this case the emulsion preferably comprises from 10 to 60 wt %, more preferably from 15 to 55 wt %, and most preferably from 20 to 50 wt % of acid functional oligomer; and from 40 to 90 wt %, more preferably from 45 to 85 wt %, and most preferably from 50 to 80 wt % of the hydrophobic second stage composition.

The weight average molecular weight of the oligomer is preferably in a range from 5,000 to 100,000 Daltons, more preferably from 10,000 to 80,000 Daltons, even more preferably from 10,000 to 50,000 Daltons, and most preferably from 12,000 to 30,000 Daltons.

Preferably the calculated glass transition temperature (Tg) of the oligomer is in a range from 30 to 150° C., more preferably from 50 to 120° C., and most preferably from 70 to 110° C. Preferably the Tg of the hydrophobic, essentially acid free second stage polymer composition is in a range from −60 to +60° C., more preferably from −50 to +50° C., and most preferably from −30 to +45° C. It can also be envisaged that the preferred Tg ranges of oligomer and second stage composition are switched. At any rate, both phases have Tg values differing by at least 10° C., more preferred 30° C., most preferred 50° C., and even most preferred 60° C.

Preferably the acid value of the oligomer is in a range from 13 to 230 mg KOH/g of solid oligomer, more preferably from 25 to 165 mg KOH/g, especially preferably from 40 to 130 mg KOH/g, and most preferably from 45 to 85 mg KOH/g of solid oligomer. Preferably the acid value of the second stage composition is less than 13 mg KOH/g of solid second stage composition, more preferably less than 6 mg KOH/g, and most preferably 0 mg KOH/g of solid second stage composition.

In another preferred embodiment the multistage vinyl polymer includes a combination(s) of oligomer(s) and higher molecular weight polymer(s) wherein the oligomer has an acid value of from 0 to 130 mg KOH/g of solid polymer.

The preferred ratio between the amount of acid functional oligomer and the amount of the second stage composition is from 5/95 to 60/40, more preferred from 10/90 to 55/45, most preferred from 15/85 to 45/55, even most preferred from 20/80 to 40/60.

The oligomer polymer emulsion may be prepared by feeding over a set period of time the monomers making up the hydrophobic second stage composition to an aqueous oligomer solution, or by adding all monomers at once (or in a sequence of batch additions) and perform (sequential) batch polymerizations. The concentration of the chaser monomer composition will preferably be in the range from 0.8 to 54.8 wt % of the total monomer composition of the oligomer polymer emulsion. The itaconic acid ester monomer a) content will preferably be in the range from 45 to 99 wt % of the total monomer composition. The overall concentration of ionic or potentially ionic unsaturated monomers b) will preferably be in the range from 0.2 to 21 wt %. The concentration of the unsaturated monomers (c), different from (a) and (b) will preferably be in the range from 0 to 54 wt %. For the oligomer stabilized polymer emulsions a), b), c) and the chaser monomer add up to 100%.

In the case of sequential or powerfeed emulsion polymerisation, the multiple polymer phases may differ in glass transition temperature (Tg), acid value, or in the concentration of other functionalities. When the difference between the polymer phases is in Tg, the desired difference in Tg between the phases is at least 15° C., more preferably more than 30° C., even more preferably more than 50° C., and most preferably more than 70° C. It should be noted that when making a gradient morphology via powerfeed, this difference in Tg can not be measured by DSC.

The preferred phase ratio between the different polymer phases, excluding the seed, in the case of sequential and powerfeed vinyl polymers is from 10:90 to 90:10, and more preferred from 30:70 to 70:30.

The vinyl polymers described above can be combined with other types of polymers, such as alkyds, polyesters, polyurethanes, or polyepoxy resins. The combination can be achieved in different ways. Firstly, the polymer emulsions can be blended with emulsions of the other type of polymers. Secondly, the other polymers can be emulsified in the polymer emulsion prepared according to the invention. Thirdly, the other polymers can be used as hydrophobic seed for the polymerisation of the polymers according to the invention. In the latter case, the other polymers need to be present emulsified in water.

In the preparation of the polymer emulsions anionic or nonionic surfactants can be used, but certainly also the mixed anionic/nonionic surfactants. Because of the preferred seeded polymerisation process to make a multistage polymer latex of the invention, it is possible to employ quite low levels of surfactant when making such a latex. Preferably such emulsions contain less than 1 s/s % of surfactant based on total monomer content, more preferred less than 0.5 s/s %, most preferred less than 0.1 s/s %.

Preferably the solids content of the aqueous emulsion is from 30 to 60 wt %, more preferably from 35 to 50 wt % and most preferably from 40 to 45 wt % based on the total weight of the aqueous emulsion. However, for certain applications it is possible to dilute the aqueous emulsion according to the invention up to 10 wt % based on the total weight of the aqueous emulsion.

The aqueous emulsion of this invention may contain various other ingredients such as extenders (eg calcium carbonate and china clay), dispersants such as pigment dispersion aids, surfactants, wetting agents, thickeners, rheology modifiers, levelling agents, anti-cratering agents, biocides, antifoam agents, sedimentation inhibitors, UV absorbers, heat stabilisers, and antioxidants.

The aqueous emulsions according to this invention may also be crosslinked. The crosslinking can be done in 1 pack ambient cure or 2 pack. In the case of 1 pack crosslinking typical examples include Schiff-base crosslinking, using diacetone acrylamide in combination with polyhydrazides or polyamines or acetoacetoxy functionalities in combination with polyamines; silane crosslinking; or autoxidation, using fatty acid functional monomers, such as there are Serad FX522 (ex. Elementis) or Visiomer MUMA (ex. Evonik). One can also envisage modifying an epoxy functional polymer with fatty acids. In case of 2 pack crosslinking typical combinations comprise hydroxyl functionality (through incorporation of hydroxyethyl (meth)acrylate) with polyisocyanates, or acid functionality with polyaziridines.

A typical mode of 1 pack ambient cure is ion crosslinking. This can be done by combining acid or hydroxyl functionality with metal ion complexes, such as zinc, calcium, zirconium or aluminium.

It is intended to use these vinyl polymers or mixture of polymers as described above in low volatile organic solvent (VOC) applications, preferably in zero VOC applications. This means that the VOC level of the aqueous emulsion according to the invention is preferably less than 420 g/L, more preferred less than 125 g/L, even more preferred less than 50 g/L, most preferred less than 5 g/L.

The polymer emulsions according to the invention can be used as binder in coatings, paints, lacquers, inks, overprint varnish, film coatings, or adhesives. In particular the composition of invention may be in the form of (i.e. formulated as) a paint for architectural or industrial uses.

The invention coating compositions may be applied to a wide variety of substrates such as e.g. wood, paper, plastics, fibre, metal, glass, ceramics, plaster, asphalt, board, leather and concrete. Application may be any conventional method including brushing, dipping, flow coating, spraying, roller coating, and pad coating.

The composition once applied may be allowed to dry naturally at ambient temperature, or the drying process may (if feasible) be accelerated by heat.

There is further provided according to the invention a coating derived from an aqueous coating composition as defined above.

There is further provided according to the invention a method of coating a substrate which comprises applying an aqueous coating composition as defined above to a substrate and causing or allowing the aqueous carrier medium of the composition to be removed.

There is further provided according to the invention a coated substrate which has been prepared by applying an aqueous composition as defined above to a substrate and causing or allowing the aqueous carrier medium of the composition to be removed.

The present invention is now further illustrated but in no way limited by reference to the following examples. Unless otherwise specified all parts, percentages, and ratios are on a weight basis.

Test Methods

Gas Chromatography Mass Spectrometry (GCMS)

The free itaconate ester monomers content was determined by GCMS. The GCMS analyses were performed on a Trace GC-DSQ MS (Interscience, Breda, the Netherlands) equipped with a CTC combi Pal robotic autosampler for head space has been used. The carrier gas was Helium and a CP Sil 5 lowbleed/MS, 25 m×0.25 mm i.d., 1.0 μm (CP nr. 7862) column has been used.

The GC-oven was programmed from 50° C. (5 min) followed by different sequential temperature ramps of 5° C./min to 70° C. (0 min), 15° C./min to 220° C. (0 min), and ending with 25° C./min to 280° C. (10 min). A continuous Helium flow of 1.2 ml/min was used. A hot split injection at 300° C. was performed on a programmed temperature vaporizer (PTV). The injection volume was 1 μl. The MS transfer line and ion source were both kept at 250° C. The samples were measured with single ion monitoring (SIM). For the specific case of dimethyl itaconate (DMI) the masses 127.0 and 59.0 Da were used, for the internal standard (iso butyl acrylate) the masses 55.0 and 73.0 were applied. The sample solutions were approximately 500 mg in 3 ml of internal standard solution (iso butyl acrylate in acetone). The calibration was performed with 5 different concentration levels from 0 to 500 ppm. The calculation was performed using Microsoft Excel with a linear calibration curve.

Example 1

Single Phase Polymer

To a round-bottomed flask equipped with a condenser, thermometer and mechanical stirrer 339.0 parts of demineralised water, 1.5 parts of sodium bicarbonate, and 25.5 parts of a 30 wt % solution of sodium lauryl sulphate were added. The reactor contents were heated to 90° C. At 50° C. 10% of a monomer feed consisting of 13.8 parts of acrylic acid, 45.1 parts of methyl methacrylate, 137.6 parts of dimethyl itaconate, and 78.7 parts of butyl acrylate, were added together with 15% of an initiator feed consisting of 1.5 parts of sodium persulphate and 58.7 parts of demineralised water. At 90° C. feeding the remainder of the monomer and initiator feeds was started. Both feeds took 210 minutes. The mixture was stirred at 90° C. for 30 minutes after which the chaser monomer composition, consisting of 22.3 parts of styrene and 8.3 parts of butyl acrylate, was fed to the reactor over a period of 30 minutes. When this feed was completed the feed tank was rinsed with 3.6 parts of demineralised water. The batch was stirred at 90° C. for another 30 minutes after which 0.4 parts of a 70 wt % slurry of t-butyl hydroperoxide, 0.5 parts of demineralised water were added. A solution of 0.2 parts of i-ascorbic acid in 3.6 parts of demineralised water, was fed over a period of 20 minutes. The emulsion was cooled to 90° C., the pH was adjusted to 8.0 using a 25% solution of ammonia in water. The final solids content was adjusted to 45% using demineralised water.

The final emulsion had a solids content of 45%, a total itaconate concentration of 45% on total monomer and a free itaconate ester content of 132 mg/L.

Example 2

Single Phase Polymer

To a round-bottomed flask equipped with a condenser, thermometer and mechanical stirrer 339.0 parts of demineralised water, 1.5 parts of sodium bicarbonate, and 25.5 parts of a 30 wt-% solution of sodium lauryl sulphate were added. The reactor contents were heated to 90° C. At 50° C. 10% of a monomer feed consisting of 5.5 parts of acrylic acid, 123.9 parts of dimethyl itaconate, 68.8 parts of dibutyl itaconate, and 77.1 parts of butyl acrylate, was added together with 15% of an initiator feed consisting of 1.5 parts of sodium persulphate and 58.7 parts of demineralised water. At 90° C. feeding the remainder of the monomer and initiator feeds was started. Both feeds took 210 minutes. The mixture was stirred at 90° C. for 30 minutes after which the chaser monomer composition, consisting of 30.6 parts of styrene, was fed to the reactor over a period of 30 minutes. When this feed was completed the feed tank was rinsed with 3.6 parts of demineralised water. The batch was stirred at 90° C. for another 30 minutes after which 0.4 parts of a 70 wt % slurry of t-butyl hydroperoxide, 0.5 parts of demineralised water were added. A solution of 0.2 parts of i-ascorbic acid in 3.6 parts of demineralised water, was fed over a period of 20 minutes. The emulsion was cooled to 90° C., the pH was adjusted to 8.0 using a 25% solution of ammonia in water. The final solids content was adjusted to 45% using demineralised water.

The final emulsion had a solids content of 45%, a total itaconate concentration of 63% on total monomer and a free itaconate ester content of 4869 mg/L.

Example 3

Oligomer Polymer

Oligomer Synthesis

To a round-bottomed flask equipped with a condenser, thermometer and mechanical stirrer 1582.2 parts of demineralised water and 3.0 parts of a 30 wt % sodium lauryl sulphate solution were charged. This mixture was heated to 80° C. At 60° C. 5% of a monomer feed consisting of 303.3 parts of demineralised water, 8.9 parts of a 30 wt % sodium lauryl sulphate solution, 5.7 parts of lauryl mercaptane, 2.8 parts of 3-marcaptopropionic acid, 251.7 parts of methyl methacrylate, 366.8 parts of dimethyl itaconate, 35.5 parts of methacrylic acid, and 56.9 parts of diacetone acrylamide, was added. At 80° C., a solution of 0.6 parts of sodium persulphate in 27.6 parts of demineralised water was added. 10 minutes later a catalyst feed, comprising 1.5 parts of sodium persulphate and 98.0 parts of demineralised water was started together with the feeding the remainder of the monomer feed. Both feeds took 360 minutes. After the monomer feed in finished, the feed tank was rinsed with 26.4 parts of demineralised water. A temperature of 80° C. was maintained for 30 minutes after which a mixture of 38.3 parts of a 25% ammonia solution in water and 42.0 parts of demineralised water was added to the reactor. The reactor contents were stirred at 80° C. for 60 minutes, after which the oligomer was cooled to room temperature. The solids content of the resulting product was corrected to 25% with demineralised water. The final product had a pH of 8.2.

Oligomer-Polymer Synthesis

To a round-bottomed flask equipped with a condenser, thermometer and mechanical stirrer 103.9 parts of demineralised water and 504.3 parts of the oligomer were added. The contents of the reactor were heated to 60° C. At 60° C., 50% of a monomer feed consisting of 46.5 parts of butyl methacrylate, 33.1 parts of butyl acrylate, 56.9 parts of dimethyl itaconate, and 56.9 parts of dibutyl itaconate was added after which the emulsion was stirred for 5 minutes. Next, 0.3 parts of a 70 wt-% slurry of t-butyl hydroperoxide, 1.0 part of demineralised water followed by one third of a solution of 0.7 parts of i-ascorbic acid in 13.2 parts of demineralised water, were added. The temperature increased within 5 minutes. After the temperature peak at around 84° C., 6.9 parts of demineralised water were added and the temperature of the emulsion was kept at 80° C. for 30 minutes after which the batch was cooled to 60° C. Next the remainder of the monomer feed was charged and the reactor contents were stirred for 5 minutes. Next, 0.3 parts of a 70 wt % slurry of t-butyl hydroperoxide, 1.0 part of demineralised water followed by one third of the solution of 0.7 parts of i-ascorbic acid in 13.2 parts of demineralised water. This time the peak temperature was approximately 75° C., after which the batch was stirred at 75° C. for 30 minutes. Next, the chaser monomer composition consisting of 20.9 parts of styrene and 13.3 parts of butyl acrylate were added, and the mixture was stirred for 5 minutes. 0.3 parts of a 70 wt % slurry of t-butyl hydroperoxide, 1.0 part of demineralised water followed by the last third of a solution of 0.7 parts of i-ascorbic acid in 13.2 parts of demineralised water, were added. The temperature increased to ±67° C. After 30 minutes at 67° C., a post reaction consisting of 0.4 parts of a 70 wt-% slurry of t-butyl hydroperoxide, 0.6 parts of demineralised water followed by a solution of 0.3 parts of i-ascorbic acid in 4.4 parts of demineralised water, were added. The entire mixture was stirred for 20 minutes and cooled to 30° C. 4.3 parts of adipic dihydrazide was added. The batch was stirred for 5 minutes and filtrated.

The final emulsion had a solids content of 40%, a total itaconate concentration of 50% on total monomer and a free itaconate ester content of 597 mg/L.

Example 4

Sequential Polymer

To a round-bottomed flask equipped with a condenser, thermometer and mechanical stirrer were added 164.3 parts of demineralised water, which was heated to 82° C. Next, 0.2 parts of sodium bicarbonate, 13.0 parts of Surfagene FAZ109, 12.6 parts of demineralised water, and 0.2 parts of a 25% solution of ammonia in water were added. After 5 minutes, a solution of 0.2 parts of sodium persulphate in 3.2 parts of demineralised water was charged, directly followed by 10% of a monomer feed, consisting of 81.5 parts of demineralised water, 0.2 parts of sodium bicarbonate, 15.7 parts of Surfagene FAZ109, 9.5 parts of acrylic acid, 70.1 parts of butyl acrylate, 43.3 parts of dimethyl itaconate, 65.0 parts of dibutyl itaconate, and 28.7 parts of methyl methacrylate. The temperature will automatically increase to approximately 90° C. At 90° C., 80% of an initiator feed consisting of 16.4 parts of demineralised water, 0.8 parts of sodium persulphate, 0.1 parts of sodium bicarbonate, and 5.5 parts of Surfagene FAZ109, and the remainder of the monomer feed were started and the temperature was maintained at 90° C. Both feeds took 180 minutes. At the end of the monomer feed the feed tank was rinsed with 3.2 parts of demineralised water. At the end of both feeds the reactor contents were stirred for 30 minutes while a mixture of 0.4 parts of a 25% ammonia solution in water and 0.5 parts of demineralised water were added to the reactor, and 6.4 parts of demineralised water were added to the remnants of the initiator feed.

Next, the second monomer feed, consisting of 16.7 parts of demineralised water, 0.1 parts of sodium bicarbonate, 9.1 parts of Surfagene FAZ109, 2.7 parts of acrylic acid, 24.4 parts of dimethyl itaconate, 2.7 parts of dibutyl itaconate, 5.9 parts of butyl acrylate, and 18.4 parts of methyl methacrylate, was started. This feed took 60 minutes. Simultaneously, the remainder of the initiator feed was fed over a period of 90 minutes. When the monomer feed was finished, the feed tank was rinsed with 3.2 parts of demineralised water. 30 minutes after the end of the initiator feed a chaser monomer composition consisting of 27.1 parts of styrene was fed in 30 minutes. The reactor contents were stirred for 30 minutes and cooled to 60° C. Next, 0.3 parts of a 70 wt % slurry of t-butyl hydroperoxide, 0.4 parts of demineralised water were added, while simultaneously a feed of a solution of 0.2 parts of i-ascorbic acid in 13.4 parts of demineralised water, was fed. This feed took 20 minutes. The batch was stirred at 60° C. for another 30 minutes and cooled to 30° C. The pH of the emulsion was adjusted to 8.0 using a 25% solution of ammonia in water and the solids content was adjusted to 44% using demineralised water.

The final emulsion has a solids content of 44%, a total itaconate concentration of 45% on total monomer and a free itaconate ester content of 314 mg/L.

Example 5

Sequential Polymer

To a round-bottomed flask equipped with a condenser, thermometer and mechanical stirrer were added 164.3 parts of demineralised water, which was heated to 82° C. Next, 0.2 parts of sodium bicarbonate, 13.0 parts of Surfagene FAZ109, 12.6 parts of demineralised water, and 0.2 parts of a 25% solution of ammonia in water were added. After 5 minutes, a solution of 0.2 parts of sodium persulphate in 3.2 parts of demineralised water was charged, directly followed by 10% of a monomer feed, consisting of 72.0 parts of demineralised water, 0.2 parts of sodium bicarbonate, 15.7 parts of Surfagene FAZ109, 9.5 parts of acrylic acid, 67.8 parts of butyl acrylate, 43.3 parts of dimethyl itaconate, 65.0 parts of dibutyl itaconate, 19.0 parts of Plex 6852 (ex. Evonik*, and 21.6 parts of methyl methacrylate. The temperature will automatically increase to approximately 90° C. At 90° C., 80% of an initiator feed consisting of 16.4 parts of demineralised water, 0.8 parts of sodium persulphate, 0.1 parts of sodium bicarbonate, and 5.5 parts of Surfagene FAZ109, and the remainder of the monomer feed were started and the temperature was maintained at 90° C. Both feeds took 180 minutes. At the end of the monomer feed the feed tank was rinsed with 3.2 parts of demineralised water. At the end of both feeds the reactor contents were stirred for 30 minutes while a mixture of 0.4 parts of a 25% ammonia solution in water and 0.5 parts of demineralised water were added to the reactor, and 6.4 parts of demineralised water were added to the remnants of the initiator feed.

Next, the second monomer feed, consisting of 13.9 parts of demineralised water, 0.1 parts of sodium bicarbonate, 9.1 parts of Surfagene FAZ109, 2.7 parts of acrylic acid, 24.4 parts of dimethyl itaconate, 2.7 parts of dibutyl itaconate, 5.4 parts of Plex 6852*, 5.3 parts of butyl acrylate, and 16.4 parts of methyl methacrylate, was started. This feed took 60 minutes. Simultaneously, the remainder of the initiator feed was fed over a period of 90 minutes. When the monomer feed was finished, the feed tank was rinsed with 3.2 parts of demineralised water. 30 minutes after the end of the initiator feed a chaser monomer composition consisting of 27.1 parts of styrene was fed in 30 minutes. The reactor contents were stirred for 30 minutes and cooled to 60° C. Next, 0.3 parts of a 70 wt % slurry of t-butyl hydroperoxide, 0.4 parts of demineralised water were added, while simultaneously a feed of a solution of 0.2 parts of i-ascorbic acid in 13.4 parts of demineralised water, was fed. This feed took 20 minutes. The batch was stirred at 60° C. for another 30 minutes and cooled to 30° C. The pH of the emulsion was adjusted to 8.0 using a 25% solution of ammonia in water and the solids content was adjusted to 44% using demineralised water.

Plex 6852 is N-(2-Methacryloxyethyl)ethylene Urea 50% in Water (ex. Evonik)

The final emulsion had a solids content of 44%, a total itaconate concentration of 45% on total monomer and a free itaconate ester content of 685 mg/L.

Example 6

Oligomer Polymer

Oligomer Synthesis

To a round-bottomed flask equipped with a condenser, thermometer and mechanical stirrer 1582.2 parts of demineralised water and 3.0 parts of a 30 wt % sodium lauryl sulphate solution were charged. This mixture was heated to 80° C. At 60° C., 5% of a monomer feed consisting of 303.3 parts of demineralised water, 8.9 parts of a 30 wt % sodium lauryl sulphate solution, 5.7 parts of lauryl mercaptane, 2.8 parts of 3-marcaptopropionic acid, 251.7 parts of methyl methacrylate, 366.8 parts of dimethyl itaconate, 35.5 parts of methacrylic acid, and 56.9 parts of diacetone acrylamide, was added. At 80° C., a solution of 0.6 parts of sodium persulphate in 27.6 parts of demineralised water was added. 10 minutes later a catalyst feed, comprising 1.5 parts of sodium persulphate and 98.0 parts of demineralised water was started together with the feeding the remainder of the monomer feed. Both feeds took 360 minutes. After the monomer feed in finished, the feed tank was rinsed with 26.4 parts of demineralised water. A temperature of 80° C. was maintained for 30 minutes after which a mixture of 38.3 parts of a 25% ammonia solution in water and 42.0 parts of demineralised water was added to the reactor. The reactor contents were stirred at 80° C. for 60 minutes, after which the oligomer was cooled to room temperature. The solids content of the resulting product was corrected to 25% with demineralised water. The final product had a pH of 8.2.

Oligomer—Polymer Synthesis

To a round-bottomed flask equipped with a condenser, thermometer and mechanical stirrer 103.9 parts of demineralised water and 504.3 parts of the oligomer were added. The contents of the reactor were heated to 60° C. At 60° C., 50% of a monomer feed consisting of 79.6 parts of butyl acrylate, 34.1 parts of dimethyl itaconate, and 79.6 parts of dibutyl itaconate was added after which the emulsion was stirred for 5 minutes. Next, 0.3 parts of a 70 wt-% slurry of t-butyl hydroperoxide, 1.0 part of demineralised water followed by one third of a solution of 0.7 parts of i-ascorbic acid in 13.2 parts of demineralised water, were added. The temperature increased within 5 minutes. After the temperature peak at around 84° C., 6.9 parts of demineralised water were added and the temperature of the emulsion was kept at 80° C. for 30 minutes after which the batch was cooled to 60° C. Next the remainder of the monomer feed was charged and the reactor contents were stirred for 5 minutes. Next, 0.3 parts of a 70 wt-% slurry of t-butyl hydroperoxide, 1.0 part of demineralised water followed by one third of the solution of 0.7 parts of i-ascorbic acid in 13.2 parts of demineralised water. This time the peak temperature was approximately 75° C., after which the batch was stirred at 75° C. for 30 minutes. Next, the chaser monomer composition consisting of 13.8 parts of styrene and 20.4 parts of butyl acrylate, and the mixture was stirred for 5 minutes. 0.3 parts of a 70 wt % slurry of t-butyl hydroperoxide, 1.0 part of demineralised water followed by the last third of a solution of 0.7 parts of i-ascorbic acid in 13.2 parts of demineralised water, were added. The temperature increased to ±67° C. After 30 minutes at 67° C., a post reaction consisting of 0.4 parts of a 70 wt % slurry of t-butyl hydroperoxide, 0.6 parts of demineralised water followed by a solution of 0.3 parts of i-ascorbic acid in 4.4 parts of demineralised water, were added. The entire mixture was stirred for 20 minutes and cooled to 30° C. 4.3 parts of adipic dihydrazide was added. The batch was stirred for 5 minutes and filtrated.

The final emulsion had a solids content of 40%, a total itaconate concentration of 50% on total monomer and a free itaconate ester content of 122 mg/L.

The invention claimed is:

1. A coating composition comprising an aqueous emulsion comprising at least a vinyl polymer, said vinyl polymer comprising:
   a) 45 to 99 wt % of itaconate ester monomers having formula I:

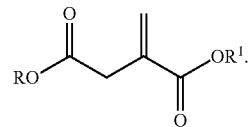

wherein R and R' are independently an alkyl or an aryl group;
   b) 0.1 to 15 wt % of ionic or potentially ionic unsaturated monomers;
   c) 0 to 54 wt % of unsaturated monomers, different from a) and b); and
   0.9 to 54.9 wt % by weight of total monomers of a chaser monomer composition added subsequently and polymerised after the polymerisation of monomers a), b) and c); wherein
   a)+b)+c) and the chaser monomer composition add up to 100%; and wherein
   the aqueous emulsion contains less than 0.5 wt % free itaconate ester based on the total weight of the aqueous emulsion.

2. The coating composition according to claim 1 wherein component a) is selected from the group consisting of dialkyl esters of itaconic acid, diaryl esters of itaconic acid, and combinations thereof.

3. The coating composition according to claim 1 wherein component b) comprises at least one or more acid functional monomers selected from the group consisting of itaconic acid, itaconic anhydride, mono-alkylesters of itaconic acid, mono-aryl esters of itaconic acid, acrylic acid, methacrylic acid, β-carboxyethyl acrylate and combinations thereof.

4. The coating composition according to claim 1 wherein component c) and/or chaser monomer composition comprise at least one or more monomers selected from the group consisting of methyl (meth)acrylate, ethyl (meth)acrylate, butyl (meth)acrylate, 2-ethylhexyl (meth)acrylate, styrene and combinations thereof.

5. The coating composition according to claim 1 wherein the vinyl polymer further comprises one or more di- or trifunctional vinyl monomers selected from the group consisting of ethylenediol diacrylate, butylenediol diacrylate, hexylenediol diacrylate, allyl (meth)acrylate, trimethylol propane triacrylate, divinyl benzene, and combinations thereof.

6. The coating composition according to claim 1 wherein the vinyl polymer further comprises from 2 to 12 wt % of ureido functional monomers.

7. The coating composition according to claim 1 wherein the vinyl polymer further comprises from 0.1 to 10 wt % of monomers comprising adhesion and/or crosslinking functionality.

8. The coating composition according to claim 1 wherein the vinyl polymer comprises at least 50 wt % of monomers derived from a renewable source.

9. The coating composition according to claim 1 wherein the VOC level of the aqueous emulsion is less than 420 g/L.

10. A process for making a coating composition comprising an aqueous emulsion comprising at least a vinyl polymer, said process comprising at least steps:
   I. emulsion polymerisation of:
      a) 45 to 99 wt % of itaconate ester monomers having formula I:

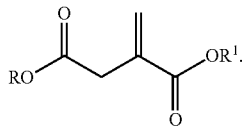

wherein R and R' are independently an alkyl or an aryl group;
   b) 0.1 to 15 wt % of ionic or potentially ionic unsaturated monomers;
   c) 0 to 54 wt % of unsaturated monomers, different from a) and b);
   II. emulsion polymerisation of 0.9 to 54.9% of monomers of a chaser monomer composition, in the presence of the vinyl polymer obtained in step I; wherein
   the monomers in I and II add up to 100%, and wherein
   the aqueous emulsion contains less than 0.5 wt % free itaconate ester monomers of formula I based on the total weight of the aqueous emulsion.

11. A process according to claim 10 wherein the vinyl polymer is a multistage polymer.

12. A process according to claim 11 wherein the multistage polymer has a phase with a Tg in a range from −50° C. to +20° C. and another phase with a Tg in a range of from +30 to 130° C.

13. A process according to claim 11 wherein the multistage polymer is a vinyl oligomer polymer, said process comprising at least steps:
   I. emulsion polymerisation of components comprising:
      a) 45 to 99 wt % of itaconate ester monomers having formula I:

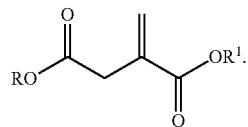

wherein R and R' independently are an alkyl or an aryl group,
   b) 0.1 to 15 wt % of ionic or potentially ionic unsaturated monomers,
   c) 0 to 54 wt % of unsaturated monomers, different from a) and b), to make an oligomer;
   II. emulsion polymerisation of unsaturated monomers comprising components a), b) and c) to make a polymer; wherein
   the Tg difference between the oligomer of step I and the polymer of step II is at least 10° C.;
   III. emulsion polymerisation of 0.9 to 54.9% of monomers of a chaser monomer composition, in the presence of the resulting vinyl oligomer polymer; wherein
   the monomers in I, II and II add up to 100%, and wherein
   the aqueous emulsion contains less than 0.5 wt % free itaconate ester monomers of formula I based on the total weight of the aqueous emulsion.

14. A coated substrate comprising a substrate and a coating on the substrate, wherein the coating comprises the coating composition according to claim 1.

15. A method of coating a substrate comprising applying a coating composition according to claim 1 onto a substrate, and causing or allowing the aqueous carrier medium of the emulsion to be removed.

16. A coated substrate which has been prepared by applying a coating composition according to claim 1 to a substrate and causing or allowing the aqueous carrier medium of the composition to be removed.

* * * * *